United States Patent [19]
Few

[11] 3,806,692
[45] Apr. 23, 1974

[54] SINTERED BEARING RACE
[75] Inventor: Peter John Few, Luton, England
[73] Assignee: SKF Industries, Inc., King of Prussia, Pa.
[22] Filed: Apr. 5, 1971
[21] Appl. No.: 130,885

[30] Foreign Application Priority Data
Apr. 13, 1970 Great Britain.................... 17528/70

[52] U.S. Cl......................... 219/121 EM, 75/208 R
[51] Int. Cl............................................. B23k 9/00
[58] Field of Search... 219/121 EB, 121 EM, 121 R; 75/208 R; 308/241, DIG. 5; 29/182.2, 182.3, 182.4, 182.5

[56] References Cited
UNITED STATES PATENTS
3,352,668  11/1967  MacDonald et al. ............. 75/208 R
3,183,086  5/1965   Kurtz et al. ...................... 75/208 R Primary Examiner—T. J. Kozma
Assistant Examiner—Gale R. Peterson

[57] ABSTRACT

A method of making a stressed machine element which method comprises providing a sintered element of substantially the same shape as that required for the stressed machine element and subjecting the surfaces of the sintered element at which rolling contact will occur to the action of an electron beam so as to melt the surface and provide a homogeneous solid skin of sufficient depth to accommodate and distribute the Hertzian stresses of the rolling contact to which the stressed machine element is expected to be subjected to use.

1 Claim, 3 Drawing Figures

PATENTED APR 23 1974　　3,806,692

INVENTOR:
PETER J. FEW
BY Howson & Howson
ATTYS.

SINTERED BEARING RACE

This invention relates to race rings for rolling bearings, toothed gears and like machine elements which, in use, are heavily stressed at the location of rolling contact with another machine element. In what follows such machine elements will be called "Stressed machine elements."

According to this invention a method of making a stressed machine element comprises providing a sintered element of substantially the same shape as that required for the stressed machine element and subjecting the surfaces of the sintered element at which rolling contact will occur to the action of an electron beam so as to melt the surface and provide a homogeneous solid skin of sufficient depth to accommodate and distribute the Hertzian stresses of the rolling contact to which the stressed machine element is subjected in use.

Preferably the sintered element is subjected to the electron beam in a vacuum as this has the effect of reducing the brittling elements at the melted surface.

If necessary the stressed machine element should be finish machined after the skin has been formed.

In another aspect the invention comprises making solid stressed machine elements by any convenient method producing scrap material (e.g., machining waste or rejected components), collecting at least some of the scrap material and, if it is not in suitable powder form, grinding it to powder, compacting and sintering charges of the powder to form machine elements of substantially the same shape as a desired stressed machine element and subjecting the rolling surfaces of the sintered machine elements to the action of an electron beam to form a solid skin thereon of a depth sufficient to absorb and distribute the Hertzian stresses expected to be generated in operation of the stressed machine element so formed.

The invention also includes stressed machine elements when made by any of the methods described above.

A bearing ring according to the invention and the method of making it will now be described by way of example with reference to the accompanying drawings of which:

Figure 1:
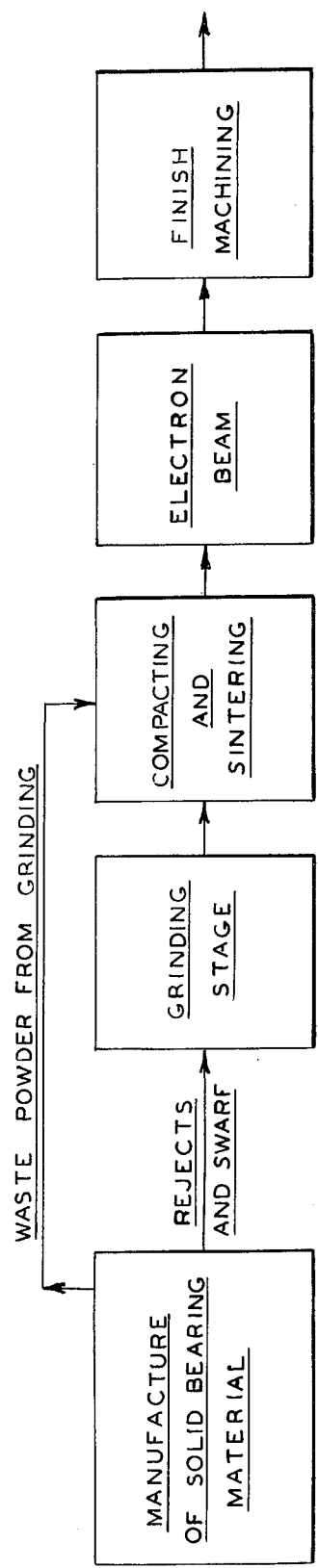
FIG. 1 is a flow diagram of the method of making the bearing ring.
Figure 3:
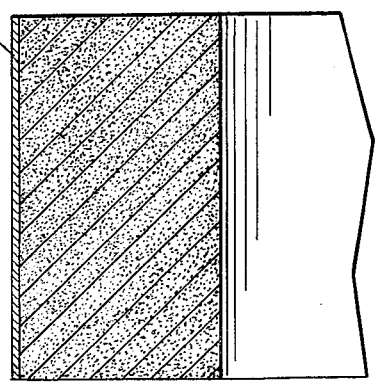
FIG. 3 is a scrap radial section of the finished bearing ring.
Figure 2:
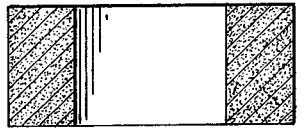
FIG. 2 is a diametral section of a sintered element.

Referring to FIG. 1 conventional solid bearing rings are manufactured by conventional means which produce swarf from at least one turning stage, rejected rings at at least one inspection stage and waste powder at at least one grinding stage. The rejected rings and swarf are collected and also any powder which is not of a suitable size for sintering. These are then ground to produce a powder of a suitable size for sintering. Such powder together with the waste powder from the grinding stages of the manufacture which is already of a suitable size are compacted and sintered in charges to form a cylinder as illustrated in FIG. 2 which is of substantially the same shape as is desired for the inner race of a cylindrical rolling bearing. The external surface of the compacted and sintered charge is then subjected to the action of an electron beam, preferably in a vacuum, so as to form a solid skin 11 (see FIG. 3) on the external surface. The thickness of the solid skin is sufficient to absorb and distribute the Hertzian stresses expected to be generated by the rollers of the cylindrical rolling bearing of which the inner ring will form part and so the necessary minimum thickness can be determined at the design stage.

After the skin 11 has been formed, its external surface is finish machined to the tolerances required for the ring.

I claim:

1. A method of making a stressed bearing ring member comprised of a core of compacted sintered material and a peripheral surface constituted by a homogeneous solid skin of predetermined depth consisting of the steps of making solid bearing ring members by any conventional method which produces ferrous scrap material, collecting at least some of the ferrous scrap material, grinding the scrap material to a suitable powder is necessary, mixing the powder formed from the scrap material with any powder of ferrous material, compacting and sintering the powder to produce the bearing ring member, subjecting the peripheral surface of the sintered element to the action of an electron beam in a vacuum so as to melt the peripheral surface and provide a homogeneous solid skin of predetermined depth having load carrying capability to accommodate and distribute the Herzian stresses to which the working surface of the bearing member is subjected and finish machining the bearing member.

* * * * *